United States Patent [19]
Krupp
[11] 3,743,789
[45] July 3, 1973

[54] BUSY BIT FOR TIME DIVISION MULTIPLEX SIGNALS TO REDUCE SIGNAL PROCESSING TIME

[75] Inventor: Roy Stephen Krupp, Rumson, N.J.
[73] Assignee: Bell Telephone Laboratories, Incorporated, Murray Hill, N.J.

[22] Filed: Dec. 27, 1971
[21] Appl. No.: 212,348

[52] U.S. Cl. ............ 179/15 BY, 179/15 AT, 1/18 J
[51] Int. Cl. .............................................. H04j 3/12
[58] Field of Search ....................... 179/18 J, 15 BY, 179/15 AT, 15 AL

[56] References Cited
UNITED STATES PATENTS
3,639,904 2/1972 Arulpragasam ............... 179/15 AL Primary Examiner—Ralph D. Blakeslee
Attorney—W. L. Keefauver et al.

[57] ABSTRACT

A predetermined bit location in each time slot word of a time division multiplex signal is reserved for including a signal bit which indicates by its signal state whether or not that particular word is in use for a call connection within the time division multiplex signal communication system. Busy bits on signal paths which are to be interconnected through a network are matched to identify a common available time slot on the paths. Busy bit signal states interact with switching equipment control memory signal states for holding up and taking down call connections.

20 Claims, 4 Drawing Figures

Patented July 3, 1973 3,743,789

4 Sheets-Sheet 4

BUSY BIT FOR TIME DIVISION MULTIPLEX SIGNALS TO REDUCE SIGNAL PROCESSING TIME

BACKGROUND OF THE INVENTION

1. Field of the Invention

This invention relates to time division multiplex communication systems in which a control signal bit is included in each time slot of communication signals transmitted through the system.

2. Prior Art

Supervisory signal bits have been included in time slots of time division multiplex signals for performing supervisory functions such as the transmission of dial tone or ring tone. Such supervisory bit times have also been used to indicate the activity state of a certain station which is normally connected to the system in the respective time slot. However, where prior art systems have required pathfinding operations for connect-search and disconnect-search functions, they have generally employed operations in which either extensive special purpose hardware logic is provided for scanning control memories to identify time slots which are available on respective sets of equipment controlled by those control memories, or substantial amounts of system central control processor time have been consumed in performing similar types of functions by program. In either case, the function is generally performed relatively slowly as compared to the operation of the remainder of the system so that a disproportionate amount of time is consumed in the system for the various pathfinding operations. Consequently, these systems are said to be attempt-limited in that their overall operation in administering a switching network is limited by the anticipated rate at which call attempts are processed rather than by the inherent speed of the device technology utilized for implementing the system parts.

It is, therefore, one object of the present invention to improve time division multiplex signal communication systems.

It is another object to reduce the need for central processor participation in establishing call connection paths through a switching network.

A further object is to facilitate the administration of call connections by providing for appropriate interactions between information signals transmitted through a network and established control signals normally available for operating the network.

SUMMARY OF THE INVENTION

The foregoing and other objects of the invention are realized in an illustrative embodiment in a time division multiplex communication system in which the signal state of a busy bit in each time slot interval of information signals transmitted through the network is controlled to indicate whether or not the time slot containing the busy bit is in use for a signal communication connection. Such a connection is here, for convenience, termed a call connection. Interactions between the busy bit and established system control signals are initiated in order to control communication path equipment in accordance with the result of the interaction.

It is one feature of the invention that busy bits in space divided, time division multiplex signal paths which are to be interconnected through a switching network are matched to find a common free time slot for facilitating that interconnection.

In accordance with another feature, the busy bits in a time division multiplex signal frame are used to control the circulation of control signal patterns in recirculating control memories for the network to influence thereby the holding up and taking down of call connections in the network.

A further feature is the interaction of busy bits with control memory signals for holding up and taking down call connections.

Still another feature is that the busy bit technique reduces demands upon the time of a system central control processor and it uses relatively inexpensive serial memory so that the need for the relatively expensive random access memory capacity in the central control processor is also reduced.

BRIEF DESCRIPTION OF THE DRAWINGS

A more complete understanding of the invention and its various features, objects, and advantages may be obtained from a consideration of the following detailed description when taken in connection with the appended claims and the attached drawings in which:

DETAILED DESCRIPTION

Figure 1:
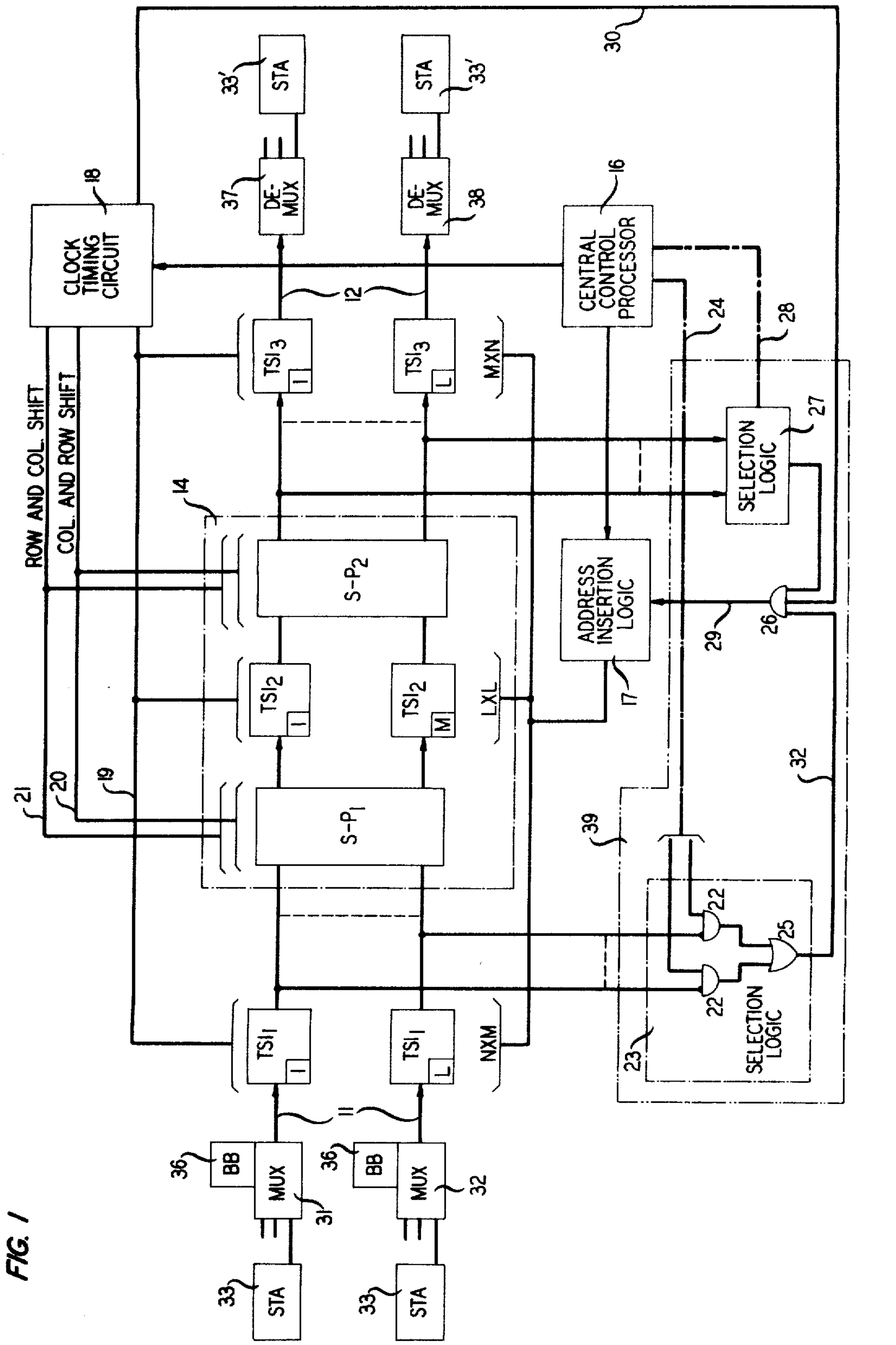
FIG. 1 is a simplified diagram of a time division multiplex communication system utilizing the invention.

FIG. 1 illustrates a time division multiplex signal communication system utilizing a time division switching network for selectively interconnecting input time division signal paths 11 with respective output time division signal paths 12. Each of the input paths serves a different one of a group of multiplexors such as the multiplexors 31 and 32, which may be of any convenient type appropriate to the speed at which it is desired to operate the overall system. Each multiplexor receives analog or digital signals from a plurality of subscriber stations 33, only one of which is illustrated in connection with each multiplexor. The multiplexors operate in the usual manner for assembling in time sequential form time gated samples of the signals from the associated subscriber stations 33. These signals are assembled in different time slots, or byte times, of recurring time division signal frames; and at least one time interval portion of each time slot is reserved for the insertion of supervisory signals at the multiplexor. In particular, each multiplexor includes logic circuits for controlling the signal state of a predetermined one of the supervisory signal intervals in each time slot to indicate in such interval whether or not the time slot is in use for a call connection. That logic is schematically represented by busy bit logic circuits 36 associated with each of the multiplexors 31 and 32. A circuit 36 writes a binary ONE signal in the busy bit interval each time that a time slot signal sample is multiplexed for a subscriber station which has previously gone off-hook, in telephone parlance. When such a subscriber returns to the on-hook condition, the busy bit logic 36 detects that event and erases the busy bit by writing a binary ZERO character in the busy bit supervisory interval of the time slot which had been theretofore used by such subscriber.

The time division switching network in FIG. 1 includes in tandem an input stage $TSI_1$ of time slot interchangers which couple the respective input paths 11 to a time shared space division switch 14. The latter switch is coupled through a further stage $TSI_3$ of time slot interchangers to the respective output time division paths 12. Those paths are respectively coupled through different demultiplexors, such as the two demultiplexors 37 and 38 shown in FIG. 1, to the receiving equipment 33' for the same subscriber stations 33. Plural space division signal paths are thus provided in the network of FIG. 1 for time division signals. Interchangers in each stage are used as switching devices and are controlled to fix the configuration of any space division path in each time slot.

The time division switching network just outlined is advantageously of the type disclosed in a copending U.S. Pat. application of R. S. Krupp and L. A. Tomko Ser. No. 212,089, filed on even date herewith, entitled "Time Division Multiplex Switching System Utilizing all Time Division Techniques," and assigned to the same assignee as the present application. The network will be described here in only sufficient detail to illustrate the principles of the use of the busy bit for simplifying the operations of setting up and taking down call connections in time division multiplex communication systems.

Thus, each input stage $TSI_1$ time slot interchanger shifts input time slot signals to predetermined output operational time slots for application to the switch 14. The latter switch utilizes a first mass serial-parallel converter stage $S\text{-}P_1$, which performs a two-dimensional shift register type of function. Such a converter takes output signals in each operational time slot from all of the stage $TSI_1$ interchangers and applies them to a different one of a plurality of switching circuits, each of which includes one of a further stage $TSI_2$ of time slot interchangers. Each of the latter interchangers operates on the time slot group of signals received from the converter stage $S\text{-}P_1$ to shift them to time slots corresponding to different ones of the output paths 12. Then the shifted signals are applied through a further mass series-parallel converter stage $S\text{-}P_2$ to an appropriate one of the interchangers of stage $TSI_3$ in the output signal path 12 to which the called subscriber is connected. At this point, in the output of switch 14, each time slot signal is in the same operational time slot position in which it was earlier appled to switch 14.

A central processor 16 is advantageously operated in a stored program control manner, now well known in the art, for controlling the operation of the illustrated time division communication system. This processor supplies time base clock signals to a clock timing circuit 18 which generates the various timing signal trains utilized throughout the system. For example, timing signals are supplied as shift commands on circuits 20 and 21 for the converter stages $S\text{-}P_1$ and $S\text{-}P_2$. Row shift commands for one stage are also employed as column shift commands in the other stage. Although some converters, e.g., magnetic single-wall domain converters, operate in response to a rotating in-plane magnetic field, the provision of such a field is also considered to be schematically represented by the circuits 20 and 21. Similarly, timing circuit 18 supplies on circuit 19 shift command signals, and any other timing signals needed, for operation of whatever type of time slot interchanger is employed in the various stages of the network. A busy bit time slot signal is provided on a circuit 30 to connect-search logic which will be subsequently described. Central control processor 16 also supplies address and timing information to address insertion logic 17 of appropriate form for writing the control memories of the various time slot interchangers. It is to be understood, however, that although the logic 17 is separately indicated in FIG. 1, at least a part of this logic is, in some time slot interchangers, integrally included as a part of the interchanger, as will be subsequently indicated in connection with FIGS. 2 and 3.

When a subscriber station is first placed in the off-hook condition, its associated multiplexor assigns a time slot; and the corresponding busy bit logic 36 writes a binary ONE in the busy bit time interval in each occurrence of such time slot. For convenience of later descriptions, it is here assumed that the busy bit interval is the third bit interval from the beginning of each time slot, but any bit position can be used.

The processor controlled system of FIG. 1 utilizes information obtained from the calling station to identify its line and time slot number and to identify the output signal path 12 and the time slot number used by the called station. This information determines a particular one of the L stage $TSI_1$ interchangers and a particular one of the L stage $TSI_3$ interchangers. That information is now used by the busy bit logic 39 for establishing a signal transmission path between those two interchangers through the time shared space division switch 14.

The output connection of each stage $TSI_1$ interchanger is connected to an inhibiting input connection of a different one of a plurality of coincidence gates 22 in input line selecting logic 23. Processor 16 applies through a circuit of a bus 24 an enabling signal to the gate 22 which is connected to the calling interchanger of stage $TSI_1$. Such an enabling signal occurs during each busy bit interval. Each time that an available time slot occurs in the output of that interchanger, the associated gate 22 is actuated to provide a binary ONE output through an OR gate 25 onto a circuit 32 for partially enabling a further coincidence gate 26. That gate also receives further enabling signals from an output line selection logic circuit 27 which is of the same type as the circuit 23. However, circuit 27 receives enabling signals on respective circuits of a bus 28 from processor 16 for selectively enabling the one of its gates 22 which has an inhibiting connection from the input of an interchanger of stage $TSI_3$ which serves the output line 12 going to the called station. The busy bit timing signal on circuit 30 also enables gate 26; and when matching available time slots are found in the output of the stage $TSI_1$ interchanger and at the input to the stage $TSI_3$ interchanger, gate 26 provides a binary ONE signal on a circuit 29 to the address insertion logic 17. Details of one form of the logic 17 will be considered in connection with FIG. 4.

Since the match occurs in the busy bit time of the common available time slot, logic 17 assigns that as the operational time slot $TS_{op}$. This latter time slot is also the output time slot $TS_o$ for the stage $TSI_1$ calling interchanger and the input time slot $TS_i$ for the stage $TSI_3$ called interchanger. Thus, input and output time slots are now available for the interchangers in stages $TSI_1$ and $TSI_3$, and their respective control memories are written in accordance with the appropriate technique for the type of interchanger used to cause each such interchanger to shift signals from its input time slot to its output time slot for the new call connection. In addition, the address insertion logic 17 utilizes the operational time slot number $TS_{op}$ as the number identifying the one of the M interchangers of the stage $TSI_2$ which will be used for the call connection in the time shared space division switch 14.

Logic 17 further utilizes the stage $TSI_1$ calling interchanger number as the input time slot number for the selected interchanger of stage $TSI_2$ and similarly uses the called interchanger number in stage $TSI_3$ as the output time slot number for the selected interchanger of stage $TSI_2$. These stage $TSI_2$ input and output time slot numbers are similarly utilized to write the necessary control information in the control memory for that interchanger. It will be appreciated that the two-dimensional shift register character of converter stage $S\text{-}P_2$ is such that it automatically changes the indicated time slot number of the output signal from the selected stage $TSI_2$ interchanger to a stage $TSI_3$ interchanger number corresponding to that time slot number. Stage $S\text{-}P_2$ completes that conversion in a time slot corresponding in number to the stage $TSI_2$ interchanger number. The latter number is also the number of the time slot $TS_{op}$. Therefore, the signal that entered switch 14 in time slot $TS_{op}$ on the calling interchanger circuit also leaves the switch in the same time slot but on the called interchanger circuit.

It will be seen from the foregoing description that once the calling and called line numbers and time slot numbers are identified, the comparatively simple busy bit logic 39 identifies the operational time slot number. This information completely defines the time-space signal path through the switching network of FIG. 1 without requiring from processor 16 anything more than ordinary timing signals and the usual signals identifying those network input and output parameters. It is not necessary to employ either complex pathfinding logic hardware or extensive pathfinding program which consumes extensive amounts of operating time on processor 16. It is likewise not necessary to scan control memories to locate free time slots, identify the numbers of such free time slots, and otherwise match or compute from such time slot information an appropriate time-space path through the network.

It will be subsequently shown in connection with FIGS. 2 and 3 that a call connection, which has been set up as just outlined, is readily taken down with the aid of the busy bits. This is done by recognizing the return to the on-hook condition by the calling subscriber and using the recognition of that state to cause busy bit logic 36 in the corresponding multiplexor to erase the busy bit in the previously assigned time slot by simply writing a binary ZERO in the bit interval. The absence of the busy bit automatically causes control memory erasure. This disconnect procedure is, then, a digital counterpart of the usual crossbar sleeve lead disconnect procedure.

Figure 2:
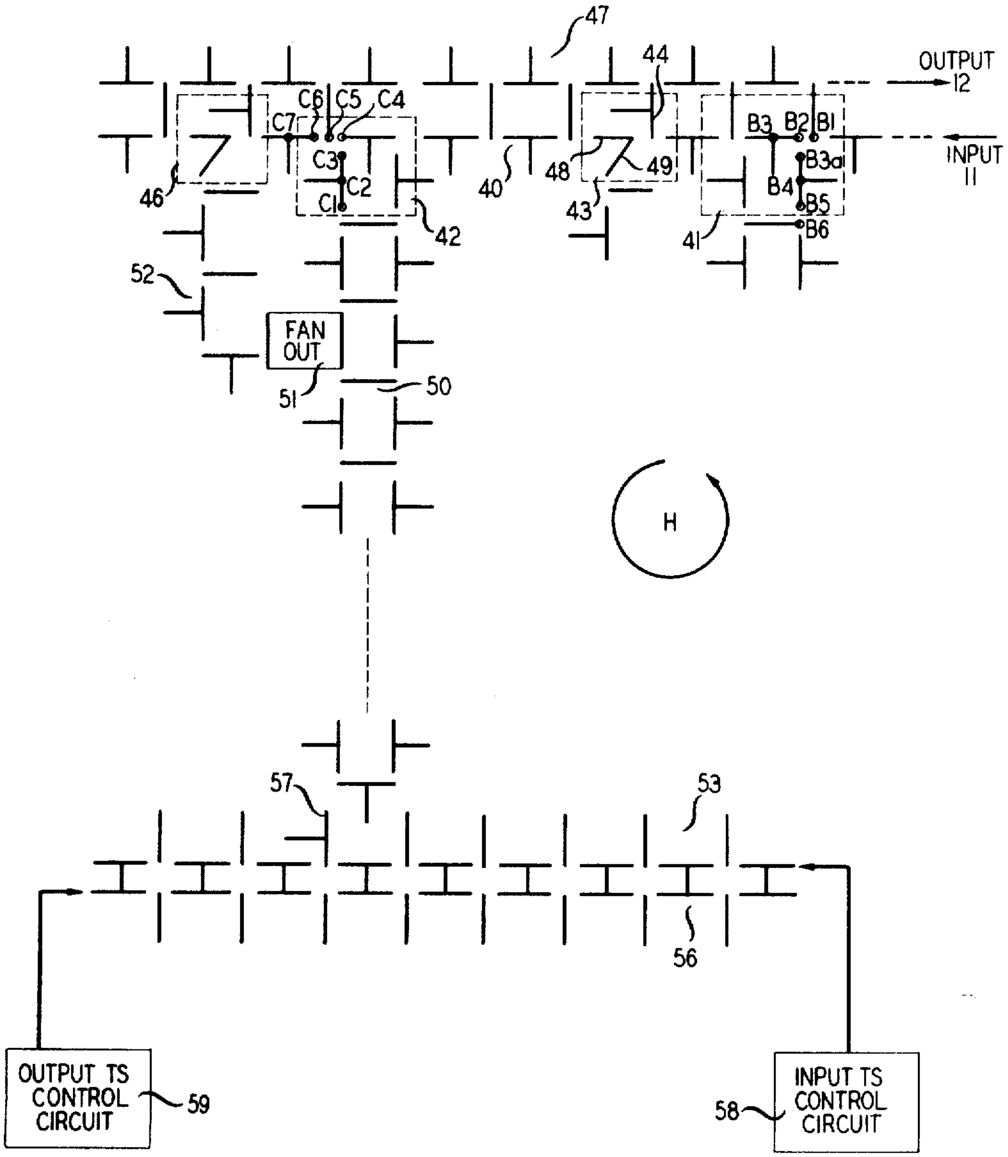
FIG. 2 is a partial schematic diagram of one form of time slot interchanger for use in the system of FIG. 1 and illustrating the use of busy bits for automatically holding up and taking down call connections.

FIG. 2 is a partial schematic diagram of a time slot interchanger of a type that is useful in the system described in connection with FIG. 1 and which is implemented in the T and bar magnetic film overlay format for an interchanger in the magnetic single-wall domain technology. A complete disclosure of such an interchanger is found in the copending application of R. S. Krupp and L. A. Tomko Ser. No. 204,143, filed Dec. 2, 1971, entitled Dynamically Switching Time Slot Interchanger," and assigned to the same assignee as the present application. Thus, the interchanger is described here only to the extent necessary to indicate the nature of the operation thereof for showing the manner in which the busy bit technique is used to hold up and take down call connections.

It is now well known in the art that a slice of certain substrate magnetic materials can host plural single-wall domains of magnetization, advnatageously in cylindrical form, oriented orthogaonally with respect to the surfaces of the plane of the slice. Those domains are movable in the substrate by altering patterns of magnetic field concentration in the slice for thereby attracting or repelling domains along predetermined domain propagation paths in the slice. Since a magnetic domain of the type just described is necessarily a region in which the magnetization is oppositely directed with respect to surrounding parts of the slice, adjacent domains exert repulsion forces upon one another if they should be brought sufficiently close to each other. This type of force thus constitutes one way to produce limited domain propagation.

More extensive domain movement is realized by utilizing suitable conductive and/or magnetic material overlays on the substrate in appropriately configured patterns for defining domain propagation paths. Such overlays are externally energized to achieve the changing magnetic field concentration patterns. One form of magnetic overlay includes iterative patterns of T and bar soft magnetic film elements, and a rotating magnetic field is reoriented in the plane of the substrate to produce shifting patterns of field concentrations at discontinuties along the periphery of the respective elements. Propagation paths, or shift registers, of this type are disclosed in the A. H. Bobeck U.S. Pat. No. 3,534,347.

In the representative part of the interchanger which is illustrated in FIG. 2, only the magnetic overlay pattern is indicated. Domain propagation takes place under the influence of a counter clockwise inplane field as indicated by an arrow H. An input shift register propagation path 40 extends across the top of the drawing for receiving time division signals from an input time division path 11 and for propagating those signals from right to left as shown in the drawing. Domain generators and annihilators at the input and output of the register are not shown since FIG. 2 depicts only an intermediate representative part of the interchanger. Plural domain interaction regions, such as the regions 41 and 42, are distributed along the length of the register 40. Associated with each such region is another interaction region, here designated a control gate, as represented by the two gates 43 and 46 in FIG. 2. A control gate is a unit of switching equipment that is to be controlled at least partially in response to the state of a busy bit. That is the gate operates in a certain time slot only to the extent that a busy bit allows the necessary control signals to be provided from control memory.

Absent some domain interaction influence, the signal domains from the path 11 are propagated undisturbed through the aforementioned interaction regions in the register 40. In order to achieve the time slot interchange function, gates, such as the gates 43 and 46, are selectively operated to deflect signal domains from the register 40 into a corresponding stage of an associated output shift register 47. In register 47 the domains are propagated from left to right in the well known manner for adjacent shift registers which share bar elements as illustrated in FIG. 2.

Each gate in FIG. 2 comprises an angular magnetic overlay element which includes, as specifically indicated for gate 43, a horizontal bar portion 48 in the data domain propagation path of register 40 and an angularly disposed bar portion 49 which is connected thereto at the right-hand end to form an acute angle opening outward to left. Also included in the gate is a T element 44 which has the crossbar thereof vertically oriented to provide the bar element function at corresponding locations of both of the registers 40 and 47. The shank portion of the T element 44 extends horizontally to the left. Gate 46 is like gate 43 and is controlled by domains propagated from a control memory loop 50 by way of a domain fan-out circuit 51 and a control domain propagation path 52 which terminates at the lower extremity of the angular bar 49. Each interchanger gate is similarly controlled by a different control memory loop.

A single domain is circulated in the loop 50 in each time slot position for which gate 46 is to be operated. This control domain circulates in a clockwise fashion in the loop 50. Fan-out circuit 51 responds to each input domain coming up the left side of loop 50 to produce a single output domain that continues up the left side of the loop and to produce a train of domains in the path 52 for actuating gate 46 throughout a time slot. The number of fan-out domains in the train is equal to the number of domain bit positions in a time slot word in register 40. Each fan-out domain proceeds up the path 52 through the bars 49 and 48 and is propagated to the left in register 40. At the left-hand end of the register 40 such domains are annihilated by an appropriate domain annihilator, not shown. However, at the time that such a fan-out domain is proceeding to and through the bars 49 and 48 in gate 46, a data domain entering the gate from the right interacts with the fan-out domain and is diverted through the T element 44 of the gate to the output shift register 47.

In order to write control domains in the control memory loops, such as loop 50, a set of domain propagation equipment, which is analogous to that represented by the registers 40 and 47, is provided. This analogous equipment includes a pair of shift registers 53 and 56, which are analogous to the registers 40 and 47, respectively, registers 53 and 56 employ a modified T and bar pattern since it is now desired to have domains move right to left in the upper one of the two shift registers and left to right in the lower one of the two registers. As can be seen in FIG. 2, the T elements in these registers share shank portions. In addition, the propagation paths of the two registers 53 and 56 are arranged to be sufficiently close so that domains attempting to pass one another in opposite directions in the two registers exert a repulsion force on each other. Assuming that loop 50 is to be written, that type of force causes the domain of register 53 to be diverted by way of a T element 57 into the lower left corner of control memory loop 50.

Each of the registers 53 and 56 is a full frame in length and also includes an additional portion, about a half frame in length and not shown in FIG. 2, at the input end thereof. That half frame portion corresponds to the frame complement of the time delay experienced by a domain in passing from register 53 through T element 57, the left side of control memory loop 50, the fan-out circuit 51 and path 52 to the gate 46.

An input time slot control circuit 58 and an output time slot control circuit 59 perform functions schematically represented by the address insertion logic 17 in FIG. 1 in that they cooperate with processor 16 to apply time coded signal domains to the registers 53 and 56. Circuit 58 applies a domain to the register 53 in the time slot position of a signal frame in which a data time slot word that is to be switched by the interchanger would enter the input shift register 40 from input path 11. Likewise, circuit 59 enters a similar time coded signal domain in the left-hand end of register 56 in the time slot position of a signal frame in which the aforementioned data time slot signal is to exit from the interchanger output register 47. These two time coded domains are propagated in opposite directions through their respective registers and meet at a domain interaction region which is adjacent to the coupling path from register 53 to one of the control memory loops, such as the loop 50. At that point, the repulsion force between the meeting domains forces the one from register 53 into the loop 50. Thus, the operation of the analogous registers 53 and 56 is such as to determine automatically which control memory loop should be written, and in what time slot it should be written, in order to actuate the corresponding control gate, such as gate 46, for shifting a data signal from the interchanger input time slot to the interchanger output time slot.

Each control memory loop has a domain interaction region, such as the region 42, where control domains interact with the transmitted data signal domains in the input shift register 40 of the interchanger. This interaction region is advantageously two bit positions to the right of the gate 46 and is appropriately spaced from the fan-out circuit 51 so that a control domain in loop 50 reaches the interaction region 42 at the same time as the busy bit for the time slot word which has its first bit just entering gate 46.

All control domains in loop 50, upon reaching the interaction region 42, are propagated from the loop into the data path of register 40 through domain positions C1 through C7, which are schematically represented by small circles in the drawing. This occurs whether or not a data signal busy bit is present.

If no gating operation is to take place, there is no control domain in loop 50. In this case, the busy bit passes through the interaction region 42 in preferred data domain positions B1 through B3, specifically indicated in region 41, and C4 through C7. Similarly, in the gate region 46 the busy bit passes through, along with the rest of the data time slot word signal, without experiencing any domain diverting interactions.

If a data time slot word signal has a busy bit in the register 40 for that time slot, and a control domain is present in loop 50 for that time slot, that busy bit domain interacts with the control domain. The busy bit domain is propagated from the data path of register 40 into the right-hand side of the control memory loop 50. Such a domain follows the positions B1 through B6 as a result of interaction with the control domain. The busy bit domain is diverted because control and busy domains at locations C2 and B2 of a single interaction region, and which are trying to reach preferred positions C3 and B3, respectively, in the course of normal propagation, interact. Since the busy bit domain is the only one with an alternate propagation path, i.e., that into position B3*a*, it is diverted as just outlined. Thus, the busy bit domain replaces the control domain at an interaction region associated with a gate that is operated to switch the time slot signal from register 40 to register 47.

If no busy bit is present in the time slot word signal, the control domain is not replaced in loop 50; and, thus, it is effectively erased. In subsequent signal frames, gate 46 cannot, therefore, be operated; and any time slot data word in that corresponding time slot position in subsequent frames continues through the register 40 to the domain annihilator at the end of the register. However, in subsequent stages of the network, an empty time slot appears that has no busy bit domain; and the control domain for switching equipment at that stage is similarly erased. Thus, the erasures ripple through the network automatically in successive frames until the entire connection has been taken down.

Figure 3:
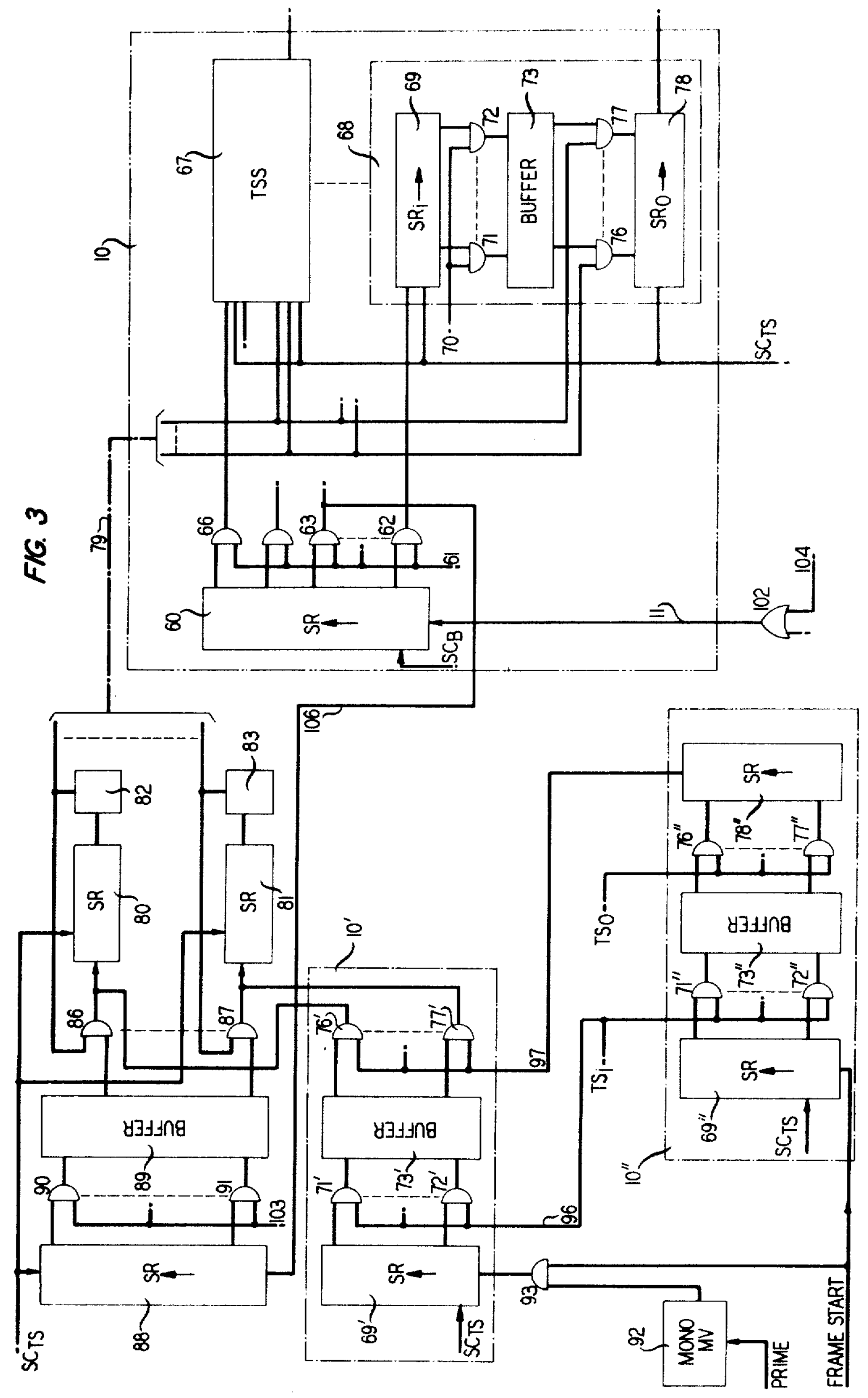
FIG. 3 is a simplified block and line diagram of a different form of time slot interchanger also illustrating the use of busy bits for holding up and taking down call connections.

FIG. 3 depicts a modified form of time slot interchanger in which the present invention is utilized. This interchanger is designed to select corresponding bits from each time slot word of a frame and apply them to a time slot switcher. Such a switcher is similar to the interchanger hereinbefore described in that it includes an input shift register and an output shift register between which selectable fixed gating paths are provided. However, in the case of the switchers utilized in the interchanger of FIG. 3, the stages of a buffer register are also included in the respective coupling paths between input and output shift registers of a switcher. This type of time slot switcher is also shown in the aforementioned Krupp et al. time slot interchanger application, and a time slot interchanger of the type illustrated in FIG. 3 is shown in a copending R. S. Krupp-L. A. Tomko patent application Ser. No. 204,142, filed Dec. 2, 1971, entitled "Time Coded Signalling," and assigned to the same assignee as the present application. However, in the case of the present FIG. 3, the interchanger is somewhat modified to accommodate the use of busy bits for setting up, holding, and taking down call connections.

Timing control signals for the embodiment of FIG. 3 are provided from the clock timing circuit 18 in FIG. 1 and include shift commands and other timing pulses. The shift commands are, in FIG. 3, designated by the reference character SC plus a subscript which indicates whether the command occurs at the bit rate or the time slot rate of input time division multiplex signals to the switcher equipment 10 illustrated in the drawing. For convenience of description it is assumed that interchanger input and output signal frames have the same number of time slots. If that is not the case, the control memory shift registers, the interchanger output shift registers, and a register 78'' (all to be described) operate at the output rate and the rest operate at the input rate.

Time division input signals are provided on the time division signal path 11 to an input shift register 60 of the equipment 10. Register 60 receives shift commands at the bit rate. At the end of each time slot interval, a timing signal on a circuit 61 enables gates, such as the coincidence gates 62, 63, and 66, to couple the contents of register 60 in bit parallel to inputs of respective time slot switchers, such as the switchers 67 and 68. Each switcher includes an input shift register 69 which has its contents gated in bit parallel, in response to a timing signal on a circuit 70, through coincidence gates, e.g., the gates 71 and 72, to a buffer register 73. The contents of the respective stages of the buffer register are selectively coupled through coincidence gates, e.g., the gates 76 and 77, to an output shift register 78 in response to gate control signals. Those signals are provided in respective circuits of a bus 79 from outputs of shift registers, e.g., the two registers 80 and 81, in the control memory for the time slot interchanger.

The control memory includes a shift register for each time slot of an information signal frame, and each register has a full frame of storage capacity on the basis of one bit per time slot. Time slot shift commands are provided for operating the control memory shift registers. Outputs from those registers are supplied to respective drivers, e.g., the drivers 82 and 83, which produce corresponding outputs on a fan-out basis to various coincidence gates throughout the interchanger. One such output from each driver is extended to an enabling input connection of a recirculating input coincidence gate for the same shift register. Two gates 86 and 87 perform the latter functions for registers 80 and 81 illustrated in the drawing. Other outputs from the drivers are extended through the bus 79 to the selection coupling gates, e.g., gates 76 and 77, in each time slot switcher. The recirculation control gates 86 and 87 are enabled in response to busy bit words applied to inputs thereof in bit parallel from shift register 88 by way of a buffer register 89 and control coupling gates, such as the two coincidence gates 90 and 91.

In the course of normal interchanger operation, the gate 63, which is in the busy bit position of each time slot word signal, couples that busy bit from shift register 60 through a circuit 106 to the input of register 88. By the time a complete frame of signals has been received in the interchanger, the register 88 contains a word made up of binary ONE busy bit signals in positions corresponding to time slots currently being employed for call connections. Also in register 88 are signals corresponding to time slots in which a call caonnection is being established. As previously mentioned, this busy bit word is coupled in bit parallel from register 88 to the buffer register 89 where the signals are available throughout the next frame for controlling recirculation in the control memory shift registers.

In the event that an error should occur in the busy bit time, a modified busy bit technique is advantageously employed to mitigate the effects of such an error. For example, at each time slot interchanger stage of the network additional logic is provided to overwrite a ONE in busy bit times of 99 frames out of each 100 frames. An OR gate 102 is included in the input signal path 11 and has a circuit 104 supplying, as an additional input, e.g., from timing circuit 18, the aforementioned train of ONE signals with a frame of ZERO signals in, e.g., every hundredth frame. The exact proportion of the busy bits that are overwritten in this way depends upon factors such as the amount of delay that can be accommodated in changing call connections for a particular system. Thus, the probability of busy bit erasure between busy bit logic 36 and the input to any interchanger stage of the network may remain the same, but its possible effects are greatly reduced. Indeed, the probability of accidental erasure of bits in a control memory from this cause is reduced by a factor of 100. Additionally, this scheme simplifies the timing of address insertion into control memories by providing for the automatic recirculation of newly inserted control bits for several frames, until the new call is actually being switched through the network.

Gate 102 and circuit 104 are shown in FIG. 3 in a network location which can be said to be at the system level. However, if there is no objection to going down to the device level, the gate and circuit can alternatively be placed in circuit 106 in FIG. 3. Use of the latter alternative then releases the busy bit interval of each time slot used for a call, in all but each hundredth frame, for the transmission of supervisory signals. Neither location for gate 102 and circuit 104 has an adverse effect on path search operations because they utilize signals outside of gate 102 in a network sense. The normal operation of the interchanger control memory blocks the entry into a switcher register 78 of any ONE signals inserted from circuit 104 into busy bit intervals of unused time slots.

Address insertion operations for the control memory are accomplished in accordance with time coded signalling technique similar to that disclosed in the aforementioned Krupp et al. application on that subject. Two sets of equipment 10' and 10'' which are at least partially analogous to the transmission equipment 10 respond to time coded signals to write the correct control memory register in the correct time slot for a desired call connection. Circuits in equipment sets 10' and 10'' that are analogous to those in equipment 10 are indicated by similar reference characters. When a network pathfinding operation has been completed a central control processor, such as the processor 16 in FIG. 1 supplies a priming pulse to indicate that the control memory of a particular time slot interchanger must be altered. That pulse triggers a monostable multivibrator 92 which provides an enabling signal to a coincidence gate 93 for a time interval of about one signal frame time in duration. The next succeeding frame start timing signal actuates AND gate 93 to enter a pulse into shift register 69'. That timing signal is entered directly into register 69''.

Shift command signals $SC_{TS}$ operate registers 69' and 69''. Upon the occurrence of the switcher input time slot $TS_i$, when the time slot signal for the prospective new call would enter register 69, a corresponding time coded signal pulse $TS_i$ is applied on a circuit 96. That pulse enables gate 71', 72' to transfer the contents of register 69' to buffer register 73'. Similarly buffer 73'' is loaded from register 69''. Now each of the buffer registers 73' and 73'' has a signal in only the one stage thereof corresponding to time slot $TS_i$.

At some time during the signal frame following the last-mentioned loading of buffer registers 73' and 73'', the time coded signal $TS_o$ loads the register 78'' with the contents of register 73'', and the single bit in register 78'' is shifted through that register during at least a part of the same frame and possibly a portion of the next signal frame. Ultimately, the pulse from register 78'' appears in the time slot $TS_{iw}$ when a selection gate of equipment 10 is to be operated; and that pulse is applied on a circuit 97 to actuate the one of the gates 76', 77' that is enabled by the single bit previously left in buffer register 73'. Output from the actuated gate is applied directly to an input of the corresponding control memory shift register. This action forces a new control signal bit into the control memory shift register corresponding to the time slot of the signal $TS_{iw}$.

It can thus be seen from the foregoing description that if a busy bit is present in the appropriate bit interval of a time slot word signal, a time slot interchanger type of operation takes place in the interchanger. However, if no busy bit is present, there is no recirculation of control signals in the corresponding control memory shift register; and there is therefore no time slot interchange gating for that time slot in the next frame for the corresponding time slot switcher. If a multiplexor, such as the multiplexor 31 in FIG. 1 erases the busy bit in a particular time slot, the corresponding control memory shift register location is likewise erased because there is no coupling from the busy bit gate 63 through registers 88 and 89 to maintain the control memory register recirculation. Thus the busy bit erasing function occurs throughout the network as the time slot word is transmitted.

Figure 4:
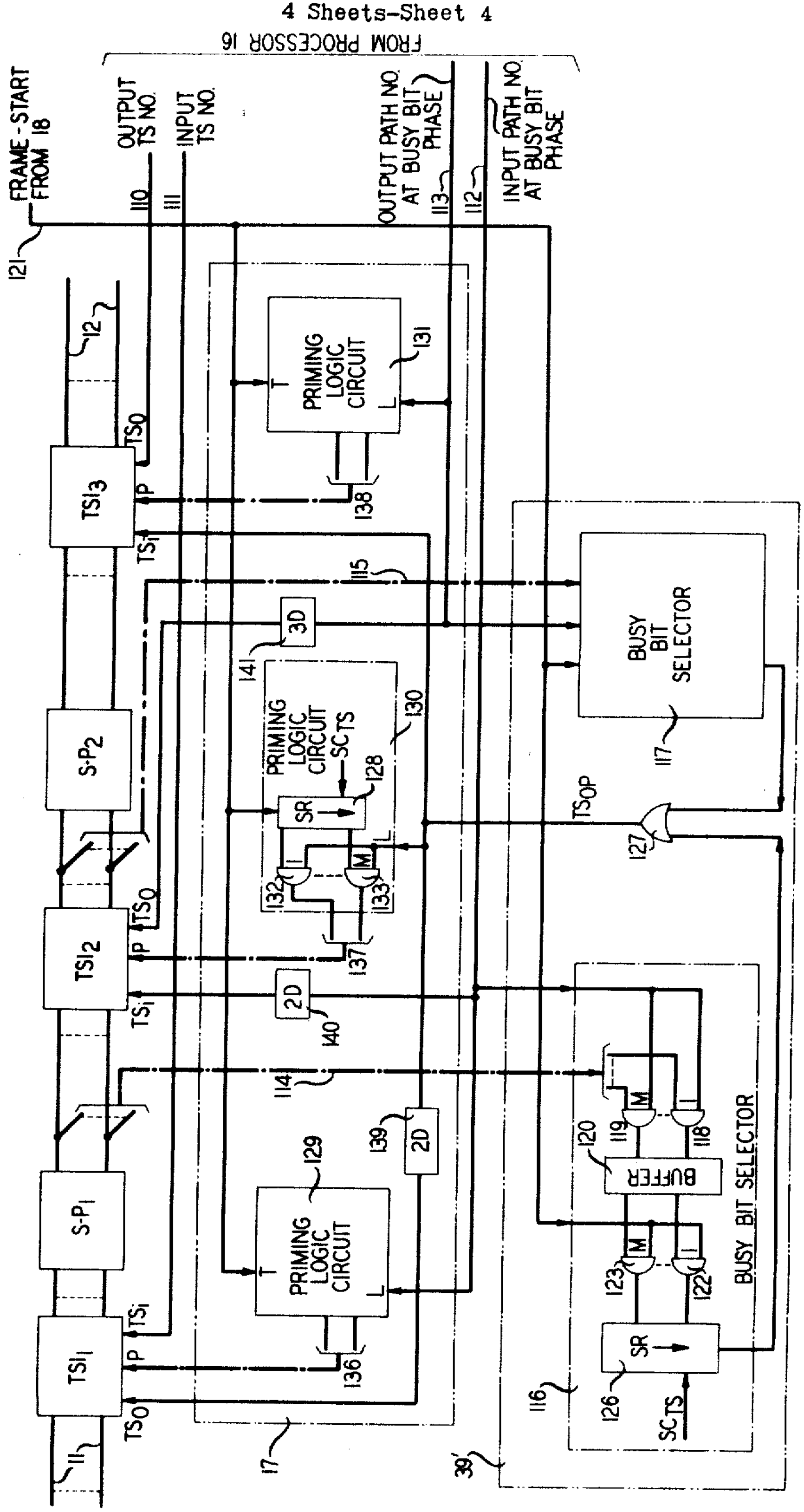
FIG. 4 is a partial diagram of a modified form of the system of FIG. 1.

FIG. 4 presents a partial diagram of the time division switching network of FIG. 1 with some associated logic circuit modifications. The address insertion logic 17 is shown in greater detail in FIG. 4, and the busy bit matching logic 39' of FIG. 4 is modified somewhat from the form shown for logic 39 in FIG. 1. Busy bit logic 39' does the path search, and it also provides time coded signal information for writing network control memories in a way which is advantageous as compared to the embodiment of FIG. 1. Thus, in FIG. 4 a reduced number of circuits are required from the central control processor 16 so that the construction is simplified and the perennial problem of heat generation in the network is reduced.

In address insertion logic 17, shift registers associated with a particular stage utilize shift commands at a rate corresponding to the number of interchangers for that stage. In circuit 39' shift command signals are supplied at a rate corresponding to the number of interchangers in stage $TSI_2$.

Central control processor 16 and the clock timing circuit 18, neither specifically shown in FIG. 4, provide the usual shift commands and frame start pulses as well as supplying time coded signal pulses indicating input time slot and path numbers for a calling termination at the input to stage $TSI_1$ and output time slot and path numbers for a called termination at the output from the stage $TSI_3$. Each time slot interchanger stage of the network in FIG. 4 is indicated by a single block, even though each such stage advantageously includes a plurality of time slot interchangers as depicted in FIG. 1. The remaining circuits shown in FIG. 4 receive the aforementioned outputs from processor 16 and timing circuit 18, and produce for each time slot interchanger stage any missing $TS_i$ or $TS_o$ time coded signals as well as a priming signal, if needed, to cause the time coded signals for the stage to operate upon only one of the plural slot interchangers. Circuitry shown in FIG. 4 is organized to facilitate an understanding of the method used for establishing call connections and is not intended as an optimum circuit wiring arrangement.

The path search function is considered first. A path search method which is similar to that employed in the circuit 39 of FIG. 1 is utilized in FIG. 4. However, different connections to the actual switching network are provided in order to reduce the number of circuits that must be extended from the processor 16 in FIG. 1. For example, in FIG. 1 the bus 24 includes a separate circuit for each time slot interchanger in stage $TSI_1$ and a separate circuit in bus 28 for each interchanger of stage $TSI_3$. However, in FIG. 4 only four circuits, 110, 111, 112, and 113, are extended from processor 16 to the call connection logic there illustrated. It is convenient to note at this point that, for interchangers of the type shown in FIG. 3, signals on circuits 112 and 113 are applied in the same frame of a call connecting operation and signals on circuits 111 and 110 are applied in the second and third frames thereafter, respectively. For interchangers of the type indicated in FIG. 2, all $TS_o$ signals are advanced by one frame.

Two busy bit selectors 116 and 117 are shown in FIG. 4. Since both are of the same type, only one is described in detail. In the selector 116, M circuits 114 are extended from the M outputs of the stage $S\text{-}P_1$ converter in the switching network to M corresponding coincidence gates, such as the two gates 118 and 119 shown in the drawing. Those gates include further sequential numbering designations corresponding to the designations employed for the time slot interchangers of stage $TSI_2$ in the respective outputs of the converter stage $S\text{-}P_1$ of FIG. 1. Each of the gates 118,119 is thus enabled according to the state of data signals in the respective output connections of the converter stage $S\text{-}P_1$.

When a path search operation is to be conducted, the gates 118,119 are activated by a time coded signal on circuit 112 to indicate the network input path number by a single pulse which is provided in the busy bit phase of the time slot utilized by the called, or input, path at the output of converter stage $S\text{-}P_1$. Consequently, the busy bits of all time slots of a frame of signals from a called path in the group of paths 11 simultaneously appear at inputs to interchanger stage $TSI_2$, and are simultaneously loaded into the respective stages of a buffer register 120. These busy bit signals are held in the register 120 until the beginning of the next time division signal frame. At the beginning of the latter frame, a frame-start pulse is provided from timing circuit 18 on a circuit 121 to various logic circuits of FIG. 4. This frame-start pulse is applied to busy bit selector 116 for actuating M coincidence gates, such as the gates 122 and 123 in FIG. 4, for transferring the contents of buffer register 120 to respective corresponding stages of a shift register 126. The latter register is operated at the time slot rate for shifting the busy bit signals out of the register to an input of a NOR logic gate 127.

The other busy bit selector 117 is operated in the same fashion as the selector 116 but it operates in response to time division signals on circuits 115 from inputs to converter stage $S\text{-}P_2$ for enabling its gates 118,119. The latter gates are actuated in response to a time coded signal on the circuit 113 which indicates the network output path number, in the output of stage $TSI_3$, at the busy bit phase of the time slot utilized by that path in the input to converter stage $S\text{-}P_2$. The output of shift register 126 in selector 117 is similarly applied as an input to NOR gate 127. The latter gate matches the busy bit outputs from selectors 116 and 117, and provides an output signal when corresponding busy bit intervals from the two selectors are found to contain binary ZEROs. This match indicates that a corresponding time slot is available in the network at both the output of the stage $TSI_1$ interchanger and the input of the stage $TSI_3$ interchanger. This output signal from NOR gate 127 is the previously discussed operational time slot signal $TS_{op}$ which represents the matched time slot numbers as well as the time slot interchanger number to be used for the prospective call connection in stage $TSI_2$.

In some network embodiments, such as that represented by the network of FIG. 3, it is advantageous to provide a priming signal in order that a single time slot interchanger in a stage group of such interchangers may be enabled to respond to time coded input and output time slot signals which are made available in multiple to all interchangers of the stage group for writing information into a control memory. To this end the aforementioned frame-start signal on circuit 121 is entered into a shift register 128 in priming logic circuits such as the priming logic circuits 129, 130, and 131 in FIG. 4. Those circuits are included in the address insertion logic 17 for both FIG. 1 and FIG. 4. Since all of those priming logic circuits are of the same type, only the circuit 130 is illustrated in detail. Shift registers 128 are operated at the time slot rate. One priming logic circuit is provided for each time slot interchanger stage of the network.

The frame-start pulse is propagated through the shift register 128 in each priming logic circuit until such time as a logic input signal is applied to a logic input L of each priming logic circuit. In circuit 130 the $TS_{op}$ output signal from the NOR gate 127 provides that logic input signal, and other arrangements are provided for the inputs L in circuits 129 and 131 as will be described. This operational time slot signal destructively transfers the contents of the shift register 128 in bit parallel to a set of coincidence gates, such as the gates 132 and 133 in logic circuit 130. Those gates are further designated 1 through M in a sequence progressing in the direction of signal propagation through register 128 and corresponding to the designations of the M interchangers of stage $TSI_2$ to which they send respective signals. Destructive output is required from register 128 in order that it not be possible for any later output from NOR gate 127 to cause a further readout from the priming logic circuits. Destructive readout is accomplished in single-wall domain shift registers by having the time slot signal $TS_{op}$ actuate a domain transfer circuit, not shown, for simultaneously transferring all domains in the register to lateral output propagation paths. Similarly, in discrete device technology the $TS_{op}$ signal is simultaneously applied as a reset signal to all stages of the register 128 by circuits not shown in the drawing.

Outputs from gates 132,133 of each logic circuit 129 through 131 are applied in respective circuits of priming signal cables 136, 137, and 138, respectively, to provide priming signals to the single time slot interchanger that is to have new information written into its control memory for each stage of the network. For example, only one priming pulse is permitted at a time in each cable and that pulse is coupled by its respective cable circuit to the input of the multivibrator 92, in FIG. 3, for the selected interchanger of the stage. If a magnetic single-wall domain embodiment of the type shown in FIG. 2 is employed in the network, the priming signal is utilized to enable the control circuits 58 and 59 of the selected time slot interchanger to respond to actuation from processor 16 for applying time coded signals to the address insertion shift registers 53 and 56.

Now that one time slot interchanger has been primed in each network stage to receive time coded writing signals, the manner of providing the latter signals will be considered. As has already been indicated, processor 16 provides directly on circuits 110 and 111, for the prospective call the network output time slot number, which is the $TS_o$ signal for stage $TSI_3$, and the network input time slot number, which is the signal $TS_i$ for stage $TSI_1$.

It has been earlier noted that the $TS_{op}$ signal is also the $TS_o$ signal for stage $TSI_1$ and the $TS_i$ signal for stage $TSI_3$. Assuming interchangers of the type shown in FIG. 3, utilization of this $TS_{op}$ signal is accomplished by applying the output of NOR gate 127 through a delay circuit 139 which causes two frames (one frame for magnetic domain interchangers) of delay to the stage $TSI_1$. That stage now has its full complement of time coded signals and these are applied in multiple to the appropriate inputs of address insertion logic for all interchangers of the stage. The two frame delay provided by circuit 139 is necessary in order that the $TS_o$ signal will be available two time frames after the FIG. 3 priming signal is applied to stage $TSI_1$ from priming logic circuit 129. Processor 16 is, of course, momentarily programmed to provide the $TS_i$ signal to that stage in the frame between the frames during which priming and $TS_i$ signals are applied. No frame delay is required for applying the output of NOR gate 127 as the $TS_i$ signal to stage $TSI_3$ because the normal timing of the application of the signal on circuit 113 to initiate operation of busy bit selector 117 and priming logic circuit 131 is such that the output from gates 127 normally appears at stage $TSI_3$ in the same time frame with the priming signal from circuit 131.

All of the priming logic circuits 129 through 131 had their operation initiated simultaneously by the frame-start signal on circuit 121. However, the gates 132,133 are actuated at different times. Thus, these gates are actuated in logic circuit 130 by the output of NOR GATE 127, which indicates in the busy bit phase which interchanger in stage $TSI_2$ should be primed. Similarly, the input path number signal on circuit 112 and the output path number signal on circuit 113 are utilized by inputs L of priming logic circuits 129 and 131, respectively, for operating their gates 132,133.

The same signals on circuits 112 and 113 are also the time coded signals representing input and output time slot numbers for stage $TSI_2$ and are applied for that purpose through delay circuits 140 and 141, respectively, which provide delays of two frames and three frames (two frames for magnetic domain embodiments), respectively, so that those time coded signals are available in consecutive time frames following the priming signal in cable 137.

Within each network stage a selected time slot interchanger has its control memory written with information representing a new call connection as supplied in accordance with FIG. 4. The supply of these signals has been accomplished without substantial processor operating time for assembling control memory information for the new call connection. Also the number of circuits required from the processor 16 to the respective network stages is substantially reduced as compared to the arrangement illustrated in FIG. 1.

Although the present invention has been described in connection with particular embodiments thereof, it is to be understood that additional applications, embodiments, and modifications which will be apparent to those skilled in the art are included within the spirit and scope of the invention.

What is claimed is:

1. In a time division multiplex switching network including switchable space-divided signal paths for time division multiplex data signals and control memories for controlling the operation of switching equipment to effect different space-divided data signal path connections through said network in different byte times of a time division multiplex signal frame, means for examining the binary code signal state of a predetermined bit in each signal byte time of a time division multiplex signal in one of said paths, switching means comprising a unit of said switching equipment and connected in said one path for controllably determining path configuration in each byte time, and means, including said control memories and responsive to the state of said predetermined bit, for controlling the condition of said switching means during each byte time including such predetermined bit.

2. The network in accordance with claim 1 in which said controlling means comprises means for storing switch control signals in a recirculating storage loop, means for applying said switch control signals to operate said switching means, and means responsive to said predetermined bit for controlling recirculation in said loop.

3. The network in accordance with claim 1 in which there are provided means for interacting said predetermined bit with signal contents of said control memories corresponding to the byte of said predetermined bit, and means for erasing said contents of said control memories controlling said switching means in response to a first predetermined state of said predetermined bit.

4. The network in accordance with claim 3 in which said control memories comprise a plurality of shift registers, each having an output coupled for controlling different ones of said switching means, means for controllably recirculating control signals in said shift registers, a buffer register connected to supply signals to control said recirculating means, further shift register, and means for coupling the contents of the last mentioned shift register in bit parallel to said buffer register at the end of each signal frame, and means for coupling said predetermined bit from each said signal byte into said last-mentioned shift register at the byte recurrence rate of said time division multiplex signal.

5. The network in accordance with claim 1 in which said network is a multistage switching network and said switching equipment comprises a plurality of said switching equipment units operated in selectable byte times by output signals from said control memories, and said controlling means comprises a plurality of control memory units each individually coupled for controlling a different one of said equipment units, means for comparing corresponding ones of said predetermined bits for circuits to be interconnected in a common byte time and for producing, in such byte time, signal state match or mismatch indications as a function of signal states of such bits, and means responsive to said match indication for writing into an appropriate one of said memory units a signal for controlling the coupled equipment unit.

6. The network in accordance with claim 1 in which at least a portion of each signal path through said network includes a magnetic single-wall domain shift register path, said controlling means comprises at least one control memory unit coupled to said part of said path, said control memory unit including magnetic single-wall domain shift register means, said control memory unit further includes means for injecting magnetic domains into said one data signal path, and means, responsive to coincidence of domains in said signal path and in said control memory unit, are provided for diverting said signal path domain into said control memory unit.

7. The network in accordance with claim 1 in which said switching means comprises a multistage switching network for interconecting signal transmission circuits by way of switching equipment units operated in selectable byte times by output signals from said control memories, and at least one of said stages comprises means for overwriting said predetermined bits in a predetermined proportion of said byte times with a signal indicating that the corresponding byte time is in use whether or not such byte time is actually in use.

8. A time division multiplex signal communication system comprising a plurality of input signal paths, a plurality of output signal paths, means for selectively coupling said input signal paths to different ones of said output signal paths in successive signal time slots so that a signal from an input path is steered to one of said output paths as a function of the configuration of said coupling means in the time slot of such signal, means for forming signals on said input paths into successive time slots of recurrent time frames, time slot signals being grouped into signal bit groups of at least two signal bits, one of which is a busy-bit signal and is allocated for a binary coded signal indicating whether or not the corresponding time slot is in use, means for writing the signal state of said busy bit to indicate whether or not the corresponding time slot is in use, and means, responsive to said state of said busy bit, for determining said coupling means configuration for such time slot.

9. The system in accordance with claim 8 in which said selective coupling means comprises means for overwriting a predetermined proportion of all of said busy bit intervals with a signal indicating that the corresponding time slot is in use whether or not such time slot is actually in use.

10. In combination, a time division multiplex signal communication network having selectable space-divided signal paths for coupling time division multiplex information signals through such network, means for storing a control signal pattern, said storing means comprising a recirculating loop storage means for said pattern, means for coupling said control signal pattern to said network for controlling selection of one of said paths in a time slot in each frame of said time division multiplx signals, and means, responsive to a first or a second signal state of a predetermined signal bit in each time slot of an information signal in said one path, for enabling recirculation of said pattern in said loop storage means upon occurrence of said first state and blocking recirculation on occurrence of said second state.

11. The combination in accordance with claim 10 in which said controlling means comprises first means for coupling said control signal pattern from said loop into said one path, and second means for coupling said predetermined bit from said one path into said loop, in response to passage of said pattern through said first coupling means, for replacing said pattern in said loop.

12. The combination in accordance with claim 10 in which said controlling means comprises gating means connected in series in said loop, and means, responsive to said predetermined bit first state, for enabling said gating means to recirculate said pattern in each signal frame in which such state occurs.

13. The combination in accordance with claim 1 in which said switching means comprises a plurality of switching equipment units in a stage of said network, and said controlling means comprises a plurality of control memory units coupled for controlling respective ones of said equipment units, a shift register adapted for operation at the recurrence rate of byte times in said time division signals, means for inserting into said register a signal indicating the start of one of said frames, means for generating a logic signal indicating one of said control memory units, gating means for controllably coupling outputs of respective stages of said register to different ones of said control memory units, and means for applying said logic signal to said gating means for coupling said frame start signal from said register to one of said control memory units for enabling operation of such unit for controlling coupling of time division multiplex signals through said equipment units.

14. The network in accordance with claim 1 in which said switching means comprises a plurality of switching equipment units in a stage of said network, each unit corresponding to a different byte time of an input signal frame of the stage, and said controlling means comprises means for matching said predetermined bits of an input path to said stage and an output path from said stage to produce a match signal indication in a byte time when the predetermined bits have a predetermined signal state, the last-mentioned byte time corresponding to one of said units,
means for providing to all of said units time coded signals for indicating when said one unit is to be operated, and
means for enabling only said one unit to respond to said time coded signals.

15. The network in accordance with claim 14 in which said matching means comprises
means for sequentially sampling said predetermined bit in each byte time of a time division multiplex signal frame of said input path,
means for sequentially sampling said predetermined bit in each byte time of a time division multiplex signal frame of said output path, and
means for comparing outputs of said input path sampling means and output path sampling means to produce said match signal indication.

16. The network in accordance with claim 14 in which said matching means comprises
means for simultaneously sampling said predetermined bits in each byte time of a time division multiplex signal frame of said input path,
means for simultaneously sampling said predetermined bits in each byte time of a time division multiplex signal frame of said output path,
a coincidence gate for producing said match signal indication in response to a coincidence of inputs in a predetermined signal state, and
means for sequentially applying corresponding byte time samples from said input path sampling means and output path sampling means to different inputs of said coincidence gate.

17. The combination in accordance with claim 16 in which
said simultaneous sampling means each comprise
plural gating means, each connected to receive at an input thereof data signals from a different one of said units, and
means for enabling said gating means in said predetermined bit time of a byte time in one of said data signal paths, and
said sequential applying means comprises for each of said simultaneous sampling means
a buffer register connected for receiving outputs of said gating means,
a shift register,
plural gating means, each connected to couple signals from a different stage of said buffer register to a corresponding stage of said shift register,
means for actuating the last-mentioned gating means after said predetermined bit time of a byte time in said one data signal path, and
means for coupling output from said shift register to said coincidence gate.

18. The network in accordance with claim 5 in which each stage of said network includes a plurality of input paths, a plurality of output paths, and a plurality of said equipment units for coupling said input paths to said output paths, and said comparing means comprises
means for sequentially sampling said predetermined bit in each byte time of a time division multiplex signal frame of one of said input paths,
means for sequentially sampling said predetermined bit in each byte time of a time division multiplex signal frame of one of said output paths, and
means for matching outputs of said input path sampling means and output path sampling means to produce said signal indications.

19. The network in accordance with claim 5 in which each stage of said network includes a plurality of input paths, a plurality of output paths, and a plurality of said equipment units for coupling said input paths to said output paths, and said comparing means comprises
means for simultaneously sampling said predetermined bits in each byte time of a time division multiplex signal frame of one of said input paths,
means for simultaneously sampling said predetermined bits in each byte time of a time division multiplex signal frame of one of said output paths,
a coincidence gate for producing said match signal indication in response to a coincidence of inputs in a predetermined signal state, and
means for sequentially applying corresponding byte time samples from said input path sampling means and output path sampling means to different inputs of said coincidence gate.

20. The network in accordance with claim 14 in which said enabling means comprises for each stage of said network
a shift register and means for operating said register at a byte time clock rate corresponding to the number of said units in such network stage,
means for entering a frame-start signal into said shift register,
gating means for coupling each stage of said shift register to a corresponding one of said units of such network stage for enabling such one unit, and
means for providing to said gating means in a time slot corresponding to said one unit a signal for enabling all of said gating means for such network stage.

* * * * *